Oct. 30, 1945.　　　W. D. KMENTT　　　2,388,159
COATING SHAFT ARTICLES
Filed May 1, 1944　　　2 Sheets-Sheet 2

Inventor
Waldemar D. Kmentt
By Willis F. Avery
Atty.

Patented Oct. 30, 1945

2,388,159

UNITED STATES PATENT OFFICE 2,388,159

COATING SHAFT ARTICLES

Waldemar D. Kmentt, Akron, Ohio, assignor to The B. F. Goodrich Company, New York, N. Y., a corporation of New York Application May 1, 1944, Serial No. 533,547

5 Claims. (Cl. 91—51)

This invention relates to the coating of shaft articles and is especially useful in the coating of cylindrical cross pins of block tracks with adhesive material.

In the manufacture of endless tracks for self-laying track type vehicles of the type in which track blocks are connected to each other by cross pins having rubber torsion springs thereabout, it has been found advisable to vulcanize the rubber-like material for the torsion springs to the cross pins and to provide a coating of rubber cement or other adhesive about the cylindrical surface of the cross pins to which the rubber-like material is adhered prior to vulcanization of the springs, the adhesive providing a bond between the rubber-like material and the metal cross pin during vulcanization of the rubber-like material.

Objects of the invention are to provide a uniform coating about the surfaces of the articles, to provide for separation of the articles from each other during the coating operation, to provide for uniform freeing of the articles, and to provide facility of handling and uniformity of results. These and other objects will appear from the following description and the accompanying drawings.

Figure 1:
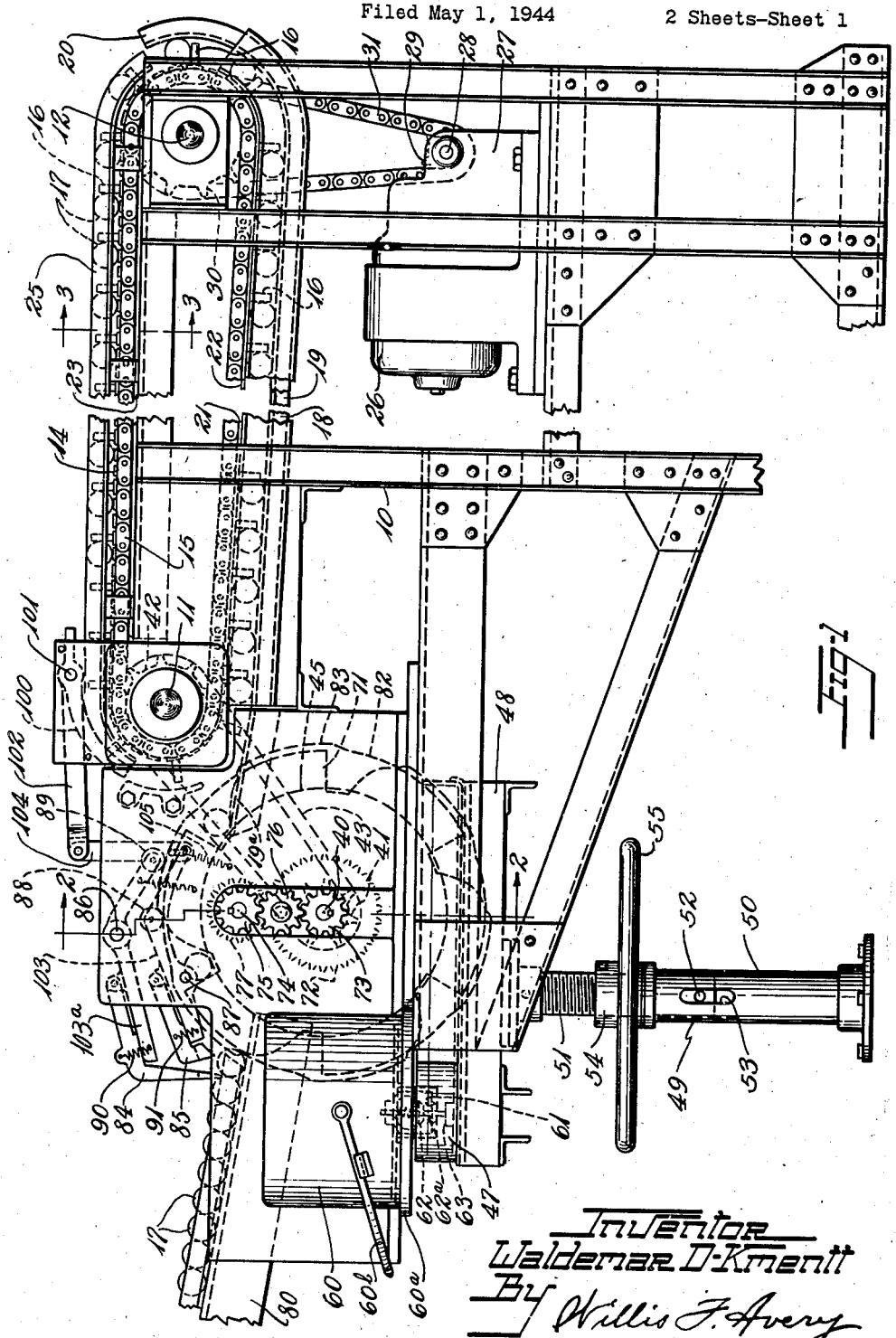
Fig. 1 is a side elevation of apparatus constructed in accordance with and embodying the invention, parts of the apparatus being broken away.
Figure 2:
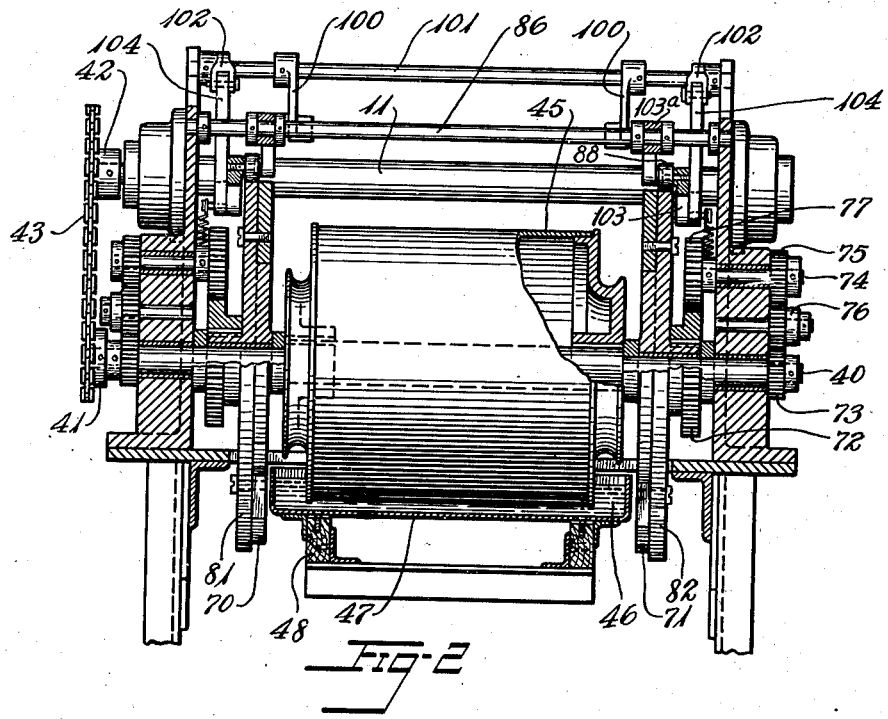
Fig. 2 is a cross section thereof taken on line 2—2 of Fig. 1, parts being broken away.
Figure 3:
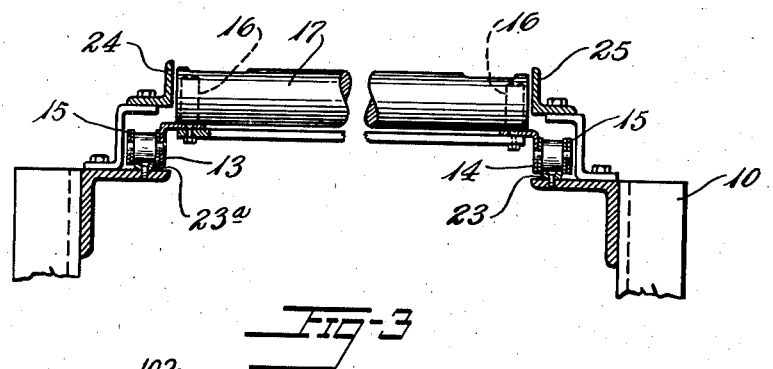
Fig. 3 is a cross section thereof taken on line 3—3 of Fig. 1, parts being broken away.

Referring to the drawings, the numeral 10 designates the frame of the apparatus which rotatably supports a pair of horizontal parallel shafts 11, 12, each of which is provided with sprockets for supporting a pair of endless chains 13, 14 trained thereabout in spaced-apart relation. Each chain is formed of links 15 having outwardly projecting pins 16 for separating and propelling the articles 17. Along the lower horizontal reaches of the chains guide rails 18, 19 are provided for supporting the articles, the guide rails being extended arcuately about the sprockets on the shafts 12 as indicated at 20 through an angle exceeding 90°. Guide rails 21, 22 are also fixed to the frame along the lower reaches of the chains to limit lateral movement of the articles being conveyed. Along the upper reaches of the chains, rails 23, 23a are provided for supporting the reaches of the chains by contact with the rollers of the chain and rails 24, 25 are provided for limiting lateral movement of the articles.

For driving the shaft 12 and thereby moving the chains along the rails, a motor 26 and speed reducer 27 are mounted on the frame. The speed reducer has a shaft 28 to which is fixed a sprocket 29, adapted to drive a sprocket 30 on shaft 12 through a chain 31.

For coating the cylindrical articles, a shaft 40 is rotatably mounted in suitable bearings on the frame 10 and has a sprocket 41 fixed thereto. The sprocket 41 is adapted to be driven by a sprocket 42 fixed to shaft 11 through a chain 43. Fixed to the shaft 40 is a rotatable drum 45. The lower part of the drum 45 engages a bath 46 of coating liquid such as rubber cement. The coating liquid is maintained at a uniform level and is contained in a tank 47, separately mounted on a frame 48, supported by a screw jack 49 from the floor on which the frame 10 rests. The screw jack has a vertical cylinder 50 in which a screw 51 is slideably mounted for vertical movement. A cross pin 52 in the lower end of the screw extends through slots 53 on opposite sides of the cylinder to prevent turning of the screw while permitting limited vertical movement. A threaded nut 54 rests upon the upper end of the cylinder 50 and has a hand wheel 55 fixed thereto whereby it may be rotated to elevate the screw 51, the threads of which it engages. By manipulation of the hand wheel 55 the depth of immersion of the drum may be regulated.

For maintaining the level of the bath 46 of liquid in the tank 47 a feeding fountain is provided, and this comprises a container 60 closed at its upper end and open at the bottom as seen in Fig. 1. A removable lid 60a closes the bottom of the container and has a valve opening 61 adapted to be closed by a valve 62. The valve 62 has a stem 62a to which is attached a weight 63. The container 60 has a bail 60b by which it may be carried. The arrangement is such that the container 60 may be removed from the machine, inverted, and filled with coating liquid. The cover 60a may then be secured and the container may then be placed over the tank 47 as shown. The weight 63 causes the valve 62 to normally close the opening 61 when the container 60 is in the position shown but removed from the machine, but when the container is placed over the tank 47 as shown, the weight 63 strikes the bottom of the tank 47 and opens the valve 62. Thereafter as liquid is removed from the tank 47 a supply of liquid flows from the container 60 to maintain a constant level in the tank 47.

Rotatably mounted about the shaft 40 in such spaced-apart relation as to engage the articles to be coated near their opposite ends are a pair of feeding discs 70, 71 having equally spaced notches in their peripheries for engaging about the opposite cylindrical ends of the articles. For rotating the feeding discs at a speed slower than the peripheral speed of the drum 45, each feeding disc has a gear 72 fixed thereto and adapted to be driven from a pinion 73 fixed to an end of the shaft 40. For this purpose a counter shaft 74 is journaled through a side member of the frame 10 and has a pinion 75 fixed to one end thereof and adapted to be driven through an idler gear 76 from pinion 73. A pinion 77 is fixed to the opposite end of the shaft 74 in position to engage the gear 72 fixed to the feeding disc. The arrangement is such that the peripheral speed of the drum 45 is greater than the speed of the feeding discs. The shaft or pin articles to be coated rest upon the face of the drum 45 with their ends rotatably supported in the notches of the feeding discs and the feeding discs rotate in a clockwise direction as seen in Fig. 1, whereas the drum 45 rotates in a counterclockwise direction at a higher surface speed, thereby causing the articles to roll upon the face of the drum as they are conveyed by the feeding discs past the drum. For removing the coated articles from the feeding discs, the pushing side of each notch in the feeding disc is made substantially radial whereas the other side of the notch is inclined so as to be substantially level at the delivery position and at such delivery position the rails 18, 19 are inclined upwardly as at 19a and extend between the feeding discs in a position to receive the coated article as it arrives at the delivery position. Articles positioned in the notches of the feeding discs are delivered in a counterclockwise direction in Fig. 1 about an upper arc of the coating drum 45 and at the delivery position contact the upwardly turning rails along which they roll until they contact with the pins 16 of the chains 13, 14 at which position they clear the notches of the feeding disc. The articles 17 are fed to the coating drum by parallel rails 80 inclined forwardly to permit the articles to roll freely toward the feeding discs.

Figure 4:
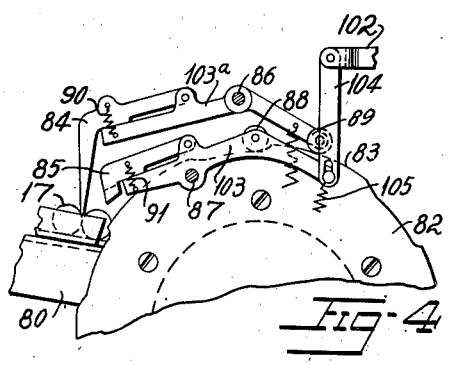
Fig. 4 is a detail view of the escapement mechanism, parts being broken away.

For delivering the articles one at a time in the notches of the feeding discs without interference of other articles an escapement mechanism is provided. For this purpose cam plates 81, 82 are fixed to the feeding discs 70, 71 respectively and in addition to limiting lateral movement of the articles by contact with their ends, are provided with raised cam surfaces 83. Escapement fingers 84, 85 are pivotally mounted on levers 103a, 103 respectively near each end of the article. Levers 103, 103a, pivotally mounted on shafts 87, 86 respectively, have cam engaging rollers 88, 89 adapted to be raised and lowered by the cam surfaces. The arrangement is such that fingers 84 and 85 are alternately raised and lowered in the path of the articles 17 by the cam surfaces and when fingers 84 are lowered and fingers 85 simultaneously raised, as shown in Fig. 4, the first article is released so that it is free to roll into the first pair of oncoming notches of the feeding disc, while the following article is prevented from rolling by the fingers 84, and as the most advanced article 17 rolls into the notches of the feeding discs, the fingers 85 are lowered in the path of the following article. The fingers 84 are simultaneously raised to advance the following article until it contacts the fingers 85. Immediately thereafter the fingers 84 are lowered and the fingers 85 are raised releasing the next article and permitting it to roll into contact with the feeding discs. For convenience the escapement fingers 84, 85 are hingedly connected to the levers 103a, 103 and held toward the levers by coil springs 90, 91 so that the fingers and levers operate as though made in one piece with the exception that should the finger in being lowered contact with one of the cylindrical articles 17 the finger will not be broken and the machine jammed by reason of the raised cam surface forcing the fingers against the top face of the articles.

In the operation of the apparatus, the operator places the article 17 on the inclined rails 80, from which they are released one at a time by the escapement fingers 84, 85 in timed relation with the feeding discs so that one article drops into each pair of notches in contact with the coating drum 45 and is conveyed in a clockwise direction about the surface of the coating drum in rolling contact therewith while the article receives a uniform coating of liquid. This is facilitated by the fact that shafts or pins of the kind here involved are usually cylindrical, although the apparatus is useful also with shafts of other than strictly cylindrical shapes, for example of oval cross-section. After travelling about the upper face of the coating drum the articles roll from the notches of the feeding discs onto the inclined rail ends 19a, down which they roll until they contact with pins 16 of the chain. The pins 16 are arranged on the chain so that they separate the articles from contact with each other and each article as it is delivered along the rails 18, 19 is covered by a pair of pins 16 following it before the next article rolls down the inclined ends 19a of the rails. As the articles are carried along the lower reach of the chains they are kept in engagement with the rails 18, 19 until they have passed above the center of the sprockets on the shaft 12 whereupon the articles are lifted to the upper reach of the chains by the pins 16 and are conveyed along the upper reach, drying as they progress. Near the end of the upper reach of the chains the articles are removed by the operator.

To prevent re-entry of the articles into the notches of the feeding discs a pair of curved levers 100 are fixed to a rod 101 pivoted on the frame of the machine and normally hang in the path of the articles 17. Should these articles attempt to pass about the shaft 11, levers 100 are raised rotating rod 101 and a pair of levers 102, fixed to the rod 101, are raised from the position shown in Fig. 1. The ends of the levers 102 are pivotally connected to the levers 103 by links 104. Levers 103 are pivotally secured to fingers 85. The arrangement is such that when levers 102 are raised, fingers 85 are lowered in the path of articles on the inclined rails 80, preventing feeding of the articles from said rails to the feeding discs and thereby preventing the entry of more than one article into one pair of notches of the feeding discs. A tension coil spring 105 having one end secured to a lever 103 and the other end secured to the frame of the machine normally holds the lever 102 in its lowered position.

In the operation of the machine the container 60 is inverted and placed over the tank 71 which supports it. Liquid flows from the container 60 to provide the bath 46. The hand wheel 55 is manipulated to raise the bath to provide the desired immersion of the coating drum 45 and the motor 26 is started causing the feeding discs and the drying conveyor to be set in operation. A supply of articles 17 are placed on the rails 80 and are automatically fed one at a time to the escapement mechanism into the notches of the feeding discs. The feeding discs advance the article in a clockwise direction as seen in Fig. 1 and the articles are free to rotate in the notches of the feeding disc under contact of the liquid coated drum 45 which rotates in the opposite direction at a higher speed. The articles thereby pick up a coating of liquid about their cylindrical surfaces and are advanced to the delivery position where they escape from the notches of the feeding discs to the inclined rail portions 19a under the influence of gravity and rolling down the inclined portion of the rails 18, 19 are stopped by contact with the pins 16 of the conveyor chains. These pins cause the articles to be advanced along the lower reach of the conveyor and elevate them to the upper reach, the conveyor being of such extent that the liquid coating is dried upon the articles as they advance there along, forming a coating thereon. At the upper reach of the drying conveyor the articles are removed by a second operator.

While the invention is especially useful in the coating of cross pins for endless tracks, it may also be used for coating other rotatable articles such as the shafts or cores of torsion springs for various uses, wringer rolls, and other rubber covered rolls or the like.

Variations may be made without departing from the scope of the invention as it is defined by the following claims.

I claim:

1. Apparatus for coating rotatable articles, said apparatus comprising a body having a rotatable surface, means for continuously supplying coating material to said surface, rotatable means for advancing articles in succession along the coated surface in rolling contact therewith, said means for advancing the rotatable articles comprising a pair of peripherally notched feeding discs for rotatably engaging portions of the articles overhanging said surface, means for rotating said discs, and means for simultaneously rotating said body.

2. Apparatus for coating rotatable articles, said apparatus comprising a body having a rotatable surface, means for rotating the same, means for supplying coating material to said surface, rotatable means for advancing articles in succession along the coated surface in rolling contact therewith, the advancing means including notched feeding discs, means for rotating said feeding discs in a direction opposite to the direction of rotation of said surface, and means for conveying the articles from said surface in succession and separated from contact with each other to dry the coatings on the articles.

3. Apparatus for coating rotatable articles, said apparatus comprising a body having a rotatable surface, means for rotating the same, means for supplying coating material to said surface, rotatable means for advancing articles in succession along the coated surface in rolling contact therewith, the advancing means including notched feeding discs, means for rotating said feeding discs in a direction opposite to the direction of rotation of said surface, an inclined feeding table terminating adjacent the peripheries of the feeding discs, escapement means for controlling movement of articles from the feeding table to the notches in the discs, and means for conveying the articles from said surface in succession and separated from contact with each other to dry the coatings on the articles.

4. Apparatus for coating surfaces of rotatable articles, said apparatus comprising a body having a rotatable surface, means for rotating said body in one direction, means for supplying coating material to said surface, rotatable means for advancing articles in succession along the coated surface in the opposite direction and in rolling contact therewith, and means for conveying the articles from said surface in succession and separated from contact with each other to dry the coatings on the articles, the means for advancing the articles from said surface comprising inclined rails having ends projecting in the path of the articles on said surface and a conveyor having spacing pins for separating articles on said rails.

5. Apparatus for coating surfaces of rotatable articles, said apparatus comprising a body having a rotatable surface, means for rotating said body in one direction, means for continuously supplying a liquid coating material to said surface, rotatable means for advancing articles in succession along the coated surface in the opposite direction and in rolling contact therewith, and means for advancing the articles in succession from said surface and separated from contact with each other to dry the coatings on the articles, the means for supplying liquid to said surface comprising a bath of the liquid coating material, means for adjusting the elevation of the bath to cause a portion of the rotatable surface to be immersed therein, and means for maintaining the liquid in the bath at a constant level.

WALDEMAR D. KMENTT.